(12) United States Patent
Zhang et al.

(10) Patent No.: US 12,297,049 B2
(45) Date of Patent: May 13, 2025

(54) TRACTION MECHANISM FOR PIPELINE CONVEYING APPARATUS AND PIPELINE CONVEYING APPARATUS COMPRISING THE SAME

(71) Applicant: Shanghai Yamato Scale Co., Ltd., Shanghai (CN)

(72) Inventors: Xiong Zhang, Shanghai (CN); Youjun Liao, Shanghai (CN)

(73) Assignee: Shanghai Yamato Scale Co., Ltd., Shanghai (CN)

( * ) Notice: Subject to any disclaimer, the term of this patent is extended or adjusted under 35 U.S.C. 154(b) by 88 days.

(21) Appl. No.: 18/341,195

(22) Filed: Jun. 26, 2023

(65) Prior Publication Data
US 2023/0331491 A1    Oct. 19, 2023

Related U.S. Application Data

(63) Continuation of application No. PCT/CN2022/095510, filed on May 27, 2022.

(30) Foreign Application Priority Data

Jun. 9, 2021    (CN) .......................... 202110642080.0
Jun. 9, 2021    (CN) .......................... 202121285046.4

(51) Int. Cl.
B65G 19/24    (2006.01)
B65G 19/14    (2006.01)
B65G 45/12    (2006.01)

(52) U.S. Cl.
CPC ............. B65G 19/24 (2013.01); B65G 19/14 (2013.01); B65G 45/12 (2013.01); *B65G 2201/042* (2013.01)

(58) Field of Classification Search
CPC ........ B65G 19/24; B65G 19/14; B65G 45/12; B65G 2201/042; B65G 19/16; B65G 23/44
See application file for complete search history.

(56) References Cited

U.S. PATENT DOCUMENTS

RE22,789  E  *  9/1946  Brunner .................. B65G 19/14
                                                   198/716
3,047,128  A  *  7/1962  Escher ..................... B65G 19/28
                                                   198/727
3,722,664  A  *  3/1973  Hart ........................ B65G 19/14
                                                   198/716

(Continued)

FOREIGN PATENT DOCUMENTS

CN    100999281  A    7/2007
CN    102069995  A    5/2011

(Continued)

*Primary Examiner* — Mark A Deuble
(74) *Attorney, Agent, or Firm* — Mei & Mark LLP; Manni Li

(57) ABSTRACT

A traction mechanism for pipeline conveying apparatus comprises a flat belt and a plurality of trays fixedly arranged in the lengthwise direction at intervals on the flat belt. The pipeline conveying apparatus further comprises a pipeline, where the traction mechanism is arranged in the pipeline in a penetrating manner, and the pipeline conveying apparatus is further provided with a driving mechanism for driving the traction mechanism to move in the pipeline.

11 Claims, 5 Drawing Sheets

(56) References Cited

U.S. PATENT DOCUMENTS

| | | | | |
|---|---|---|---|---|
| 4,430,812 | A * | 2/1984 | Van der Ent | E02F 3/146 |
| | | | | 198/809 |
| 4,471,868 | A * | 9/1984 | Buschbom | B65G 19/14 |
| | | | | 198/860.4 |
| 5,947,261 | A * | 9/1999 | Baker | B65G 19/14 |
| | | | | 198/734 |
| 8,668,424 | B2 * | 3/2014 | Niemeyer | B65G 19/14 |
| | | | | 52/197 |
| 9,027,742 | B2 * | 5/2015 | Rudolfo Van Arragon | |
| | | | | B65G 19/14 |
| | | | | 198/719 |
| 9,181,033 | B2 * | 11/2015 | Stenson | B65G 15/44 |
| 2009/0266680 | A1 * | 10/2009 | Bertolini | B65G 19/24 |
| | | | | 198/728 |
| 2012/0279829 | A1 | 11/2012 | Sterner et al. | |
| 2016/0272427 | A1 * | 9/2016 | Kaeb | B65G 15/44 |

FOREIGN PATENT DOCUMENTS

| | | |
|---|---|---|
| CN | 102991948 A | 3/2013 |
| CN | 103625845 A | 3/2014 |
| CN | 210762649 U | 6/2020 |
| CN | 210762650 U | 6/2020 |
| CN | 202110642080.0 | 6/2021 |
| CN | 202121285046.4 | 6/2021 |

* cited by examiner

TRACTION MECHANISM FOR PIPELINE CONVEYING APPARATUS AND PIPELINE CONVEYING APPARATUS COMPRISING THE SAME

CROSS-REFERENCE TO RELATED APPLICATIONS

The subject application is a continuation of PCT/CN2022/095510 filed on May 27, 2022, which in turn claims priority on Chinese Patent Application Nos. 202110642080.0 and 202121285046.4, both filed on Jun. 9, 2021 in China. The contents and subject matters of the PCT international stage application and Chinese priority applications are incorporated herein by reference.

TECHNICAL FIELD

The present invention relates to pipeline conveying apparatuses, and in particular, a traction mechanism for a pipeline conveying apparatus and the pipeline conveying apparatus comprising the same, which are specially useful for conveying granular and powdered food.

BACKGROUND ART

Currently, there are two traction methods (traction mechanisms) for pipeline conveying apparatuses, namely, the chain ring traction method (traction mechanism) and the steel rope traction method (traction mechanism). The chain ring traction mechanism uses a pipe chain machine, and the steel rope traction mechanism uses a pipeline machine. These machines are widely used in the industries related to chemical raw materials, feeds, etc., and have the characteristics of being closed and compact in spatial arrangement. However, due to the risk of sanitation and breakage, the pipe chain and pipeline machines are difficult to be used in the food industry, especially for conveying ready-to-eat food. For the pipe chain machine, as the materials are clamped into the gaps between the chain rings, they are damaged, while the materials clamped in the chain ring gaps are difficult to clean and remove; further, the materials accumulated therein go bad or breed bacteria. For the pipeline machine, the steel rope of the pipeline machine is formed by stranding fine steel wires, and the materials in steel wire gaps are difficult to clean and remove, and accumulated materials can go bad or breed bacteria. The steel rope may be coated with a glue to solve the problem of material adhesion, however, the falling of the glue from the coating brings new hidden danger to food sanitation.

For the pipeline machine, the tooth-shaped driving wheel is meshed with the material tray to generate a driving force to drag the whole rope tray. Thus, the material tray must be strong enough while the elongation of the steel cable needs to be controlled within a small range to avoid failure in the correct engagement. These requirements greatly increase the manufacturing cost for the machine.

SUMMARY OF INVENTION

The present invention provides a novel traction mechanism for the pipeline conveying apparatus and a pipeline conveying apparatus comprising the same, which overcomes the defects of the current pipe chain and pipeline machines. The present invention further provides a pipeline conveying method that has the advantages of low crushing rate, sanitation, silence, small occupied area, compact space arrangement, and lower cost for the food industry, especially for conveying ready-to-eat food.

The traction mechanism for the pipeline conveying apparatus of the present invention comprises a flat belt, where a plurality of trays are fixedly arranged in a lengthwise direction of the flat belt, and the trays are arranged at an interval on the flat belt.

In the traction mechanism of the present invention, the flat belt may be made of stainless steel, and has a thickness of 0.1 mm to 1.0 mm and a width of 1 mm to 100 mm.

In the traction mechanism of the present invention, the flat belt may be made of resin, and has a thickness of 0.1 mm to 3.0 mm and a width of 1 mm to 100 mm.

In the traction mechanism of the present invention, the flat belt made of resin may have a reinforcing core wire, and the reinforcing core wire may be made of stainless steel.

In the traction mechanism of the present invention, each of the plurality of trays may be provided with a notch allowing a driving portion of a driving mechanism to be attached thereto, and the width of the notch is greater than the width of the flat belt.

In the traction mechanism of the present invention, the flat belt may be provided with protrusions or holes for fixing the trays.

The pipeline conveying apparatus of the present invention comprises the traction mechanism of the present invention and a pipeline, where the traction mechanism is arranged in the pipeline in a penetrating manner, and the pipeline conveying apparatus is further provided with a driving mechanism for driving the traction mechanism to move in the pipeline.

In the pipeline conveying apparatus of the present invention, the flat belt of the traction mechanism may be annular, the driving mechanism may be of at least one driving wheel which is arranged on the annular flat belt in a sleeving manner and used for driving the annular flat belt to move in the pipeline by friction force, and the driving wheel rotates to drive the annular flat belt to move in the pipeline by wheel surface friction of the driving wheel; and the annular flat belt is further provided with a tensioning wheel.

In the pipeline conveying apparatus of the present invention, the annular flat belt may further be provided with a steering wheel.

In the pipeline conveying apparatus of the present invention, a cleaning scraper may be arranged above an attaching surface of the flat belt and the driving wheel for cleaning.

The present invention has the following advantages:

1. According to the present invention, the belt-type traction mechanism (the flat belt together with the plurality of trays are referred to as a belt tray) is arranged, and the belt-type traction mechanism is arranged on the pipeline conveying apparatus (referred to as a pipe belt machine). During the use, the flat belt is attached to the driving wheel under the action of a tensioning device (the tensioning wheel), and the whole belt tray is dragged by the friction force between the driving wheel and the flat belt. Compared with a pipe chain machine, the pipe belt machine has no chain ring gaps, the situation that materials are damaged due to being clamped into the chain ring gaps is avoided, and the situation that the materials are accumulated and go bad or breed bacteria is also avoided. Compared with a pipeline machine, the accumulation of the materials is avoided such that there is no risk of material deterioration or bacteria breeding. There is no need to coat the flat belt with a glue, and there is no risk of glue falling.

2. According to the pipeline conveying apparatus of the present invention, the whole belt tray is dragged by the friction force between the driving wheel and the flat belt, and compared with the pipeline machine, material trays (the trays) do not bear pulling force of dragging the whole belt tray, and therefore, strength of the material trays may be greatly reduced.

3. The pipeline conveying apparatus of the present invention is based on the attachment between the driving wheel and the flat belt, when the flat belt is extended, the corresponding displacement compensation may be provided under the control of the spring force or other pressure by the tensioning wheel, and the requirements for the elongation of the flat belt is not high such that a relatively cheap traction belt may be used.

DETAILED DESCRIPTION OF THE INVENTION AND EMBODIMENTS

Figure 1:
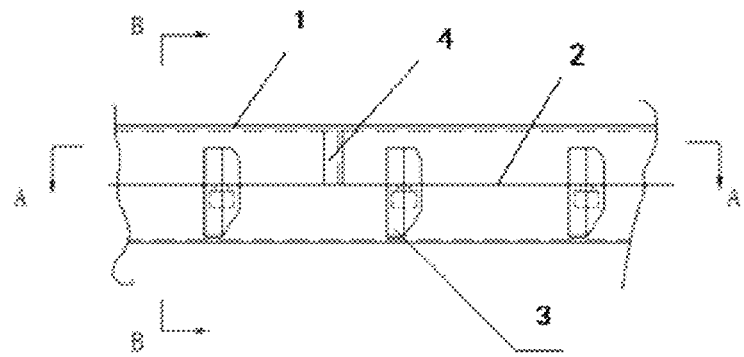
FIG. 1 shows the structure of the traction mechanism for the pipeline conveying apparatus in a first embodiment of the present invention.
Figure 2:
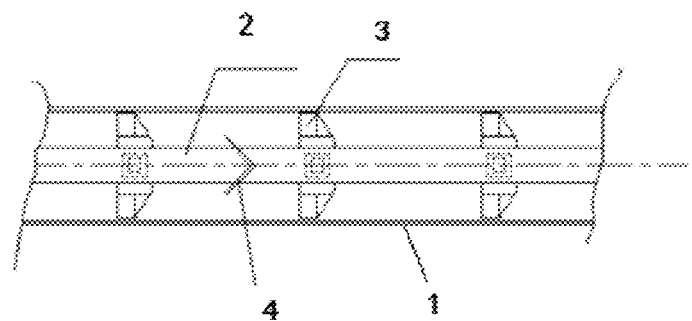
FIG. 2 shows the sectional view of the traction mechanism for the pipeline conveying apparatus in the first embodiment of the present invention along the A-A direction in FIG. 1.
Figure 3:
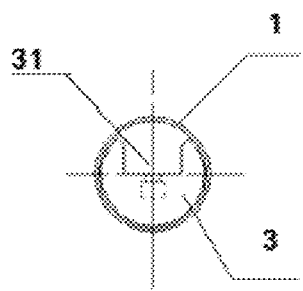
FIG. 3 shows the sectional view of the traction mechanism for the pipeline conveying apparatus in the first embodiment of the present invention along the B-B direction in FIG. 1.

FIGS. 1-3 show the structure of the traction mechanism for the pipeline conveying apparatus in the first embodiment of the present invention. As shown in the figures, the traction mechanism is arranged in pipeline 1 having a circular inner cavity section. The traction mechanism comprises a flat belt 2, where a plurality of trays 3 are fixedly arranged in a lengthwise direction of the flat belt 2, an outer edge of each tray 3 corresponds to an arc shape in an inner wall of the pipeline 1, and the trays 3 are arranged at intervals on the flat belt 2.

In the first embodiment, the flat belt 2 may be made of stainless steel and has a thickness of 0.1-1.0 mm and a width of 1-100 mm.

In the first embodiment, the flat belt 2 may also be made of resin, and has a thickness of 0.1-3.0 mm and a width of 1-100 mm. In order to increase the strength, the resin flat belt has a reinforcing core wire, which may be embedded into the resin flat belt and covered with a resin material (for a setting direction of the reinforcing core wire, a plurality of reinforcing core wires are usually arranged in parallel in the lengthwise direction of the flat belt), and the reinforcing core wire may be made of stainless steel, such that the strength of the flat belt 2 made of the resin may be improved.

In the first embodiment, the tray 3 is provided with a notch 31 allowing a driving mechanism to be attached thereto, and a width of the notch 31 is greater than a width of the flat belt 2.

In order to connect and fix the trays 3 on the flat belt 2 conveniently, and the flat belt 2 is provided with protrusions or holes for fixing the trays 3.

In order to avoid materials from being attached onto the flat belt 2 in the conveying process of the materials, a cleaning scraper 4 is arranged above an attaching surface between the flat belt 2 and a driving wheel of a driving mechanism.

Figure 4:
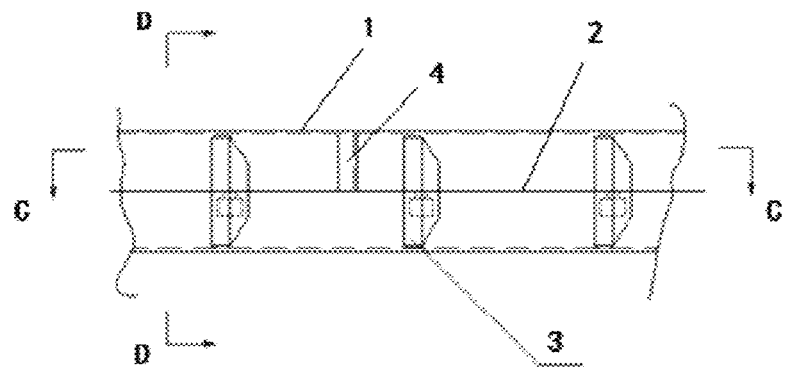
FIG. 4 shows the structure of the traction mechanism for the pipeline conveying apparatus in a second embodiment of the present invention.
Figure 5:
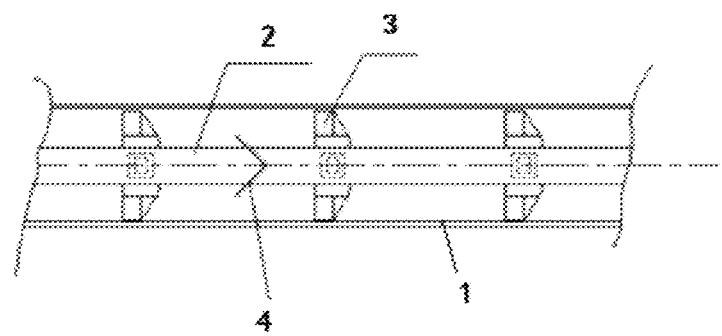
FIG. 5 shows the sectional view of the traction mechanism for the pipeline conveying apparatus in the second embodiment of the present invention along the C-C direction in FIG. 4.
Figure 6:
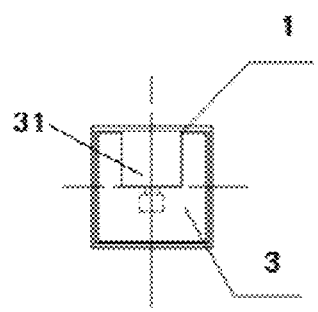
FIG. 6 shows the sectional view of the traction mechanism for the pipeline conveying apparatus in the second embodiment of the present invention along the D-D direction in FIG. 4.

FIGS. 4-6 show the structure of the traction mechanism for the pipeline conveying apparatus in the second embodiment of the present invention. As shown in the figures, the traction mechanism is arranged in pipeline 1 having a rectangular section. The traction mechanism comprises a flat belt 2, where a plurality of trays 3 are fixedly arranged on the flat belt 2, an outer edge of each tray 3 corresponds to a rectangular in an inner wall of the pipeline 1, and these trays 3 are arranged at intervals on the flat belt 2.

In the second embodiment, the flat belt 2 may be made of stainless steel, and has a thickness of 0.1-1.0 mm and a width of 1-100 mm.

In the second embodiment, the flat belt 2 may also be made of resin, and has a thickness of 0.1-3.0 mm and a width of 1-100 mm. In order to increase strength, the resin flat belt has a reinforcing core wire, which may be embedded into the resin flat belt and covered with a resin material (for a setting direction of the reinforcing core wire, a plurality of reinforcing core wires are usually arranged in parallel in the lengthwise direction of the flat belt), and the reinforcing core wire may be made of stainless steel, such that the strength of the flat belt 2 made of the resin may be improved.

In the second embodiment, the tray 3 is provided with a notch 31 allowing a driving mechanism to be attached thereto, and a width of the notch 31 is greater than a width of the flat belt 2.

In order to connect and fix the trays 3 on the flat belt 2 conveniently, and the flat belt 2 is provided with protrusions or holes for fixing the trays 3.

In order to avoid materials from being attached onto the flat belt 2 in the conveying process of the materials, a cleaning scraper 4 is arranged above an attaching surface between the flat belt 2 and a driving wheel of a driving mechanism.

Figure 7:
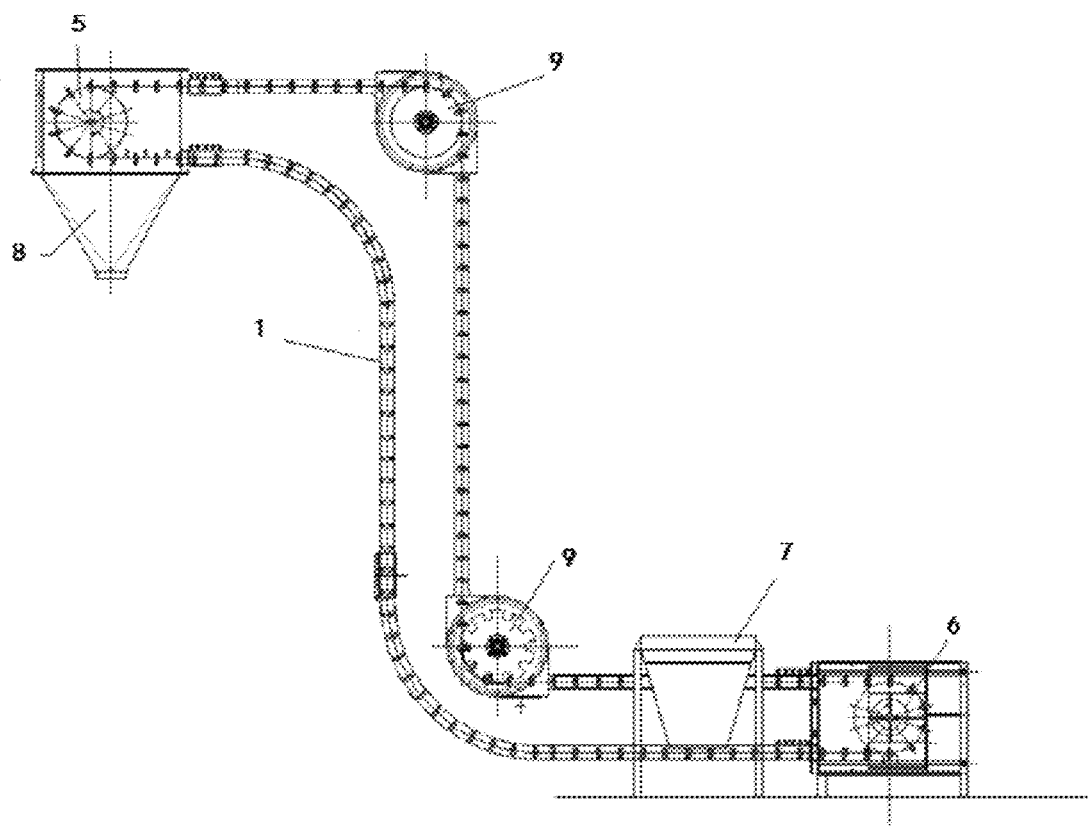
FIG. 7 shows the structure of the pipeline conveying apparatus comprising the traction mechanism in the first embodiment of the present invention.
Figure 8:
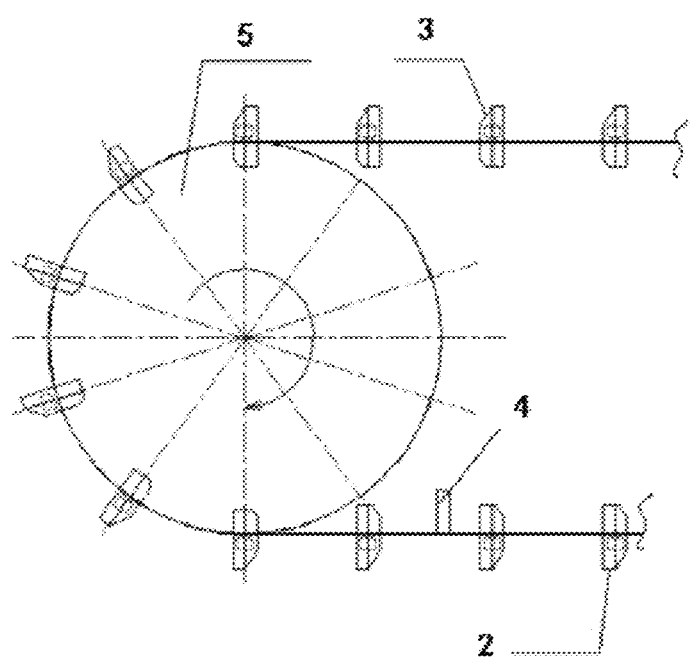
FIG. 8 shows the structure of the combined portion between the driving wheel and the flat belt in the pipeline conveying apparatus of the present invention.
Figure 9:
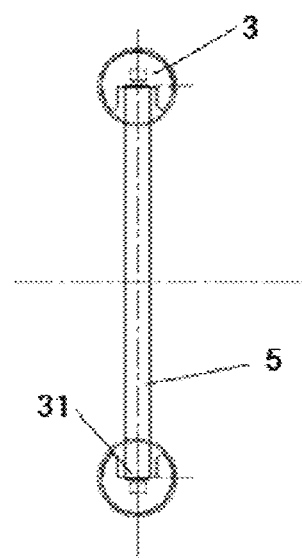
FIG. 9 shows the right view of the combined portion between the driving wheel and the flat belt in the pipeline conveying apparatus of the present invention of FIG. 8.

Furthermore, with reference to FIGS. 7-9 in combination with FIGS. 1-6, a pipeline conveying apparatus having a traction mechanism of the first or second embodiment is involved. As shown in the figures, the pipeline conveying apparatus comprises a pipeline 1, where the traction mechanism is arranged in the pipeline 1 in a penetrating manner, and the pipeline conveying apparatus is further provided with a driving mechanism for driving the traction mechanism to move in the pipeline 1.

In the present invention, the flat belt 2 of the traction mechanism is annular, the driving mechanism is of at least one driving wheel 5 which is arranged on the annular flat belt 2 in a sleeving manner and used for driving the annular flat belt 2 to move in the pipeline 1 by means of friction force, and the driving wheel 5 rotates to drive the annular flat belt 2 to move in the pipeline 1 by means of wheel surface friction of the driving wheel; and the driving wheel 5 is usually driven by an electric motor. The annular flat belt 2 is further provided with a tensioning wheel 6. During use, under an action of the tensioning wheel 6, the flat belt 2 is attached to the driving wheel 5, the whole belt tray is dragged by friction force between the driving wheel 5 and the flat belt 2, and furthermore, each tray 3 is dragged to bring materials into the pipeline 1 from a feeding hopper 7, and the materials are output by means of a discharging hopper 8 after being conveyed to a certain position, thereby continuously conveying and outputting the materials in such a structure and manner. According to the pipeline conveying apparatus of the present invention, the whole belt tray is dragged by means of the friction force between the driving wheel 5 and the flat belt 2, and material trays (the trays 3) do not bear pulling force of dragging the whole belt tray, such that strength of the material trays may be greatly reduced.

As shown in FIGS. 8 and 9, the flat belt 2 of the traction mechanism is embedded and fixed in the notches 31 of the trays 3, and when the driving wheel 5 serving as the driving mechanism drives the flat belt 2 in a friction manner, the flat belt is located in the notches 31 of the trays 3 and is not in contact with the trays. If the driving mechanism is not the driving wheel, but other driving mechanisms, the driving portion of the driving mechanism needs to be correspondingly located in the notches 31 of the trays 3.

The pipeline conveying apparatus of the present invention is based on attachment between the driving wheel 5 and the flat belt 2, when the flat belt 2 is extended, corresponding displacement compensation may be provided under control of spring force or other pressure by means of the tensioning wheel 6, and therefore, a relatively cheap traction belt may be used. The tensioning wheel 6 is a follower wheel pressed on the flat belt 2 in order to change tension of the flat belt 2.

In the pipeline conveying apparatus of the present invention, a running path of the annular flat belt 2 is further provided with a steering wheel 9, and the steering wheel 9 is used for guiding a traveling or turning path of the annular flat belt 2.

In the pipeline conveying apparatus of the present invention, a cleaning scraper 4 is arranged above an attaching surface of the flat belt 2 and the driving wheel, and the cleaning scraper 4 is used for clearing the materials adhered to the flat belt 2 during a conveying process. For example, one end of the cleaning scraper 4 is fixed on an inner wall of the pipeline 1, and the other end (the end is a scraping end) of the cleaning scraper is correspondingly attached to the flat belt 2.

The present invention provides the traction mechanism for a pipeline conveying apparatus and a pipeline conveying apparatus. The traction mechanism comprises a flat belt, where a plurality of trays are fixedly arranged in a lengthwise direction of the flat belt, and these trays are arranged at intervals on the flat belt. The pipeline conveying apparatus includes a pipeline, where the traction mechanism is arranged in the pipeline in a penetrating manner, and the pipeline conveying apparatus is further provided with a driving mechanism for driving the traction mechanism to move in the pipeline.

The present invention overcomes the defects of existing pipe chain machines and pipeline machines, and provides a pipeline conveying manner with low crushing rate, sanitation, silence, small occupied area, compact space arrangement, and lower cost for a food industry, especially conveying of ready-to-eat food.

The above-mentioned contents are merely preferred examples of the present invention and are not intended to limit the implementation scope of the present invention, that is, all equivalent changes and modifications made according to the contents of the patent scope of the present invention shall fall within the technical scope of the present invention.

We claim:

1. A traction mechanism for a pipeline conveying apparatus, comprising
a flat belt, and
a plurality of trays,
wherein the plurality of trays are fixedly arranged in a lengthwise direction of the flat belt at intervals, each of the trays comprises a notch for receiving a driving portion of a driving mechanism that engages with each of the trays, a width of the notch is greater than a width of the flat belt, and the flat belt is embedded and fixed in the notch; and
the flat belt is annular and adopted to be driven by rotating at least one driving wheel to move in a pipeline by wheel surface friction of the driving wheel.

2. The traction mechanism of claim 1, wherein the flat belt is made of stainless steel, and has a thickness of 0.1 mm to 1.0 mm and a width of 1 mm to 100 mm.

3. The traction mechanism of claim 1, wherein the flat belt is made of resin, and has a thickness of 0.1 mm to 3.0 mm and a width of 1 mm to 100 mm.

4. The traction mechanism of claim 3, wherein the resin flat belt comprises a reinforcing core wire.

5. The traction mechanism of claim 4, wherein the reinforcing core wire is made of stainless steel.

6. The traction mechanism of claim 1, wherein the flat belt is provided with protrusions or holes for fixing the trays.

7. A pipeline conveying apparatus, comprising
the traction mechanism as described in claim 1,
the driving mechanism, and
the pipeline,
wherein the traction mechanism is arranged in the pipeline in a penetrating manner, and the driving mechanism drives the traction mechanism to move in the pipeline.

8. The pipeline conveying apparatus of claim 7, wherein the driving mechanism comprises at least one driving wheel arranged on the flat belt in a sleeving manner for driving the flat belt to move in the pipeline by friction force, and the driving wheel rotates to drive the flat belt to move in the pipeline by wheel surface friction of the driving wheel.

9. The pipeline conveying apparatus of claim 8, further comprising
a tensioning wheel arranged on the flat belt in a sleeving manner.

10. The pipeline conveying apparatus of claim 8, further comprising
a steering wheel arranged on the flat belt.

11. The pipeline conveying apparatus of claim 8, further comprising
a cleaning scraper,
wherein the cleaning scraper is arranged above an attaching surface of the flat belt and the driving wheel.

* * * * *